J. L. ROUTIN.
ANTI-AIRCRAFT CONTROL SYSTEM.
APPLICATION FILED JULY 23, 1917.

1,345,697.

Patented July 6, 1920.
9 SHEETS—SHEET 1.

Joseph Louis Routin
By Maury, Cameron, Lewis & Massie
Attorneys

J. L. ROUTIN.
ANTI-AIRCRAFT CONTROL SYSTEM.
APPLICATION FILED JULY 23, 1917.
1,345,697.
Patented July 6, 1920.
9 SHEETS—SHEET 2.
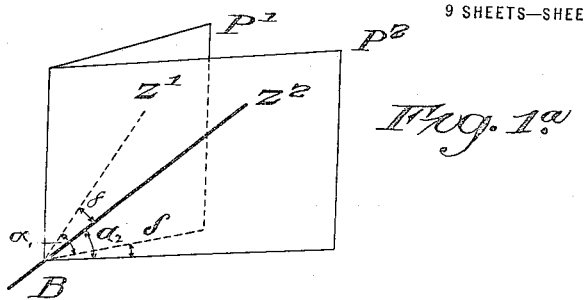
Fig. 1ª
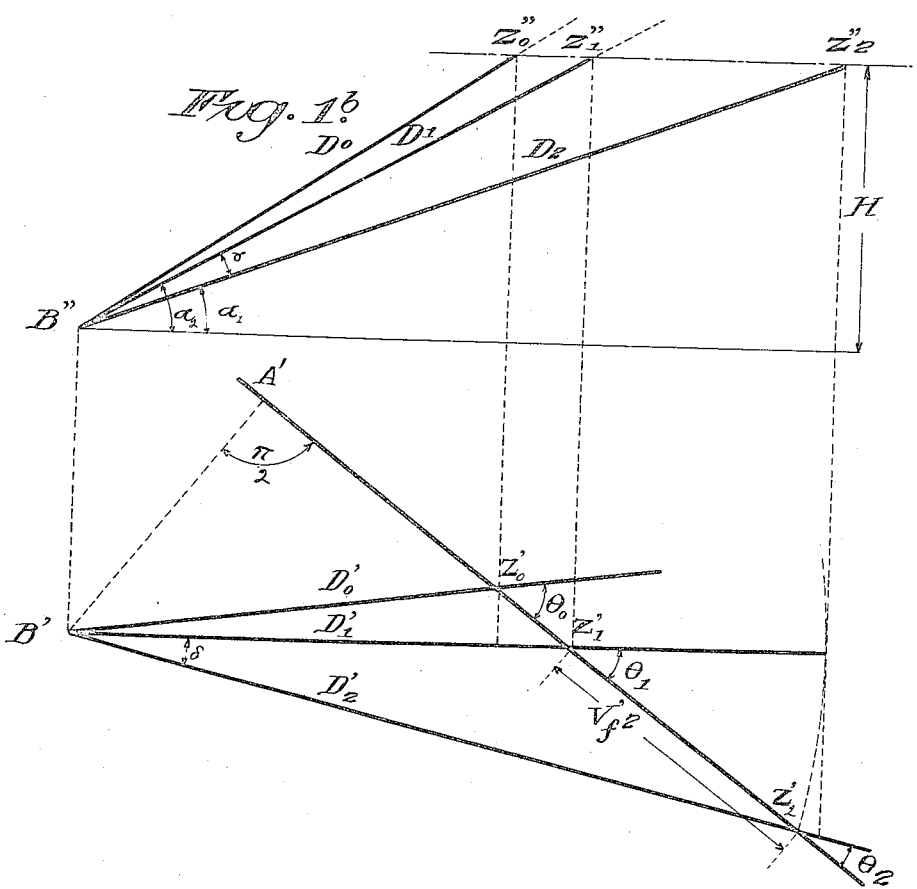
Fig. 1ᵇ
INVENTOR.
Joseph Louis Routin
BY
Mauro, Cameron, Lewis Massie
ATTORNEYS.

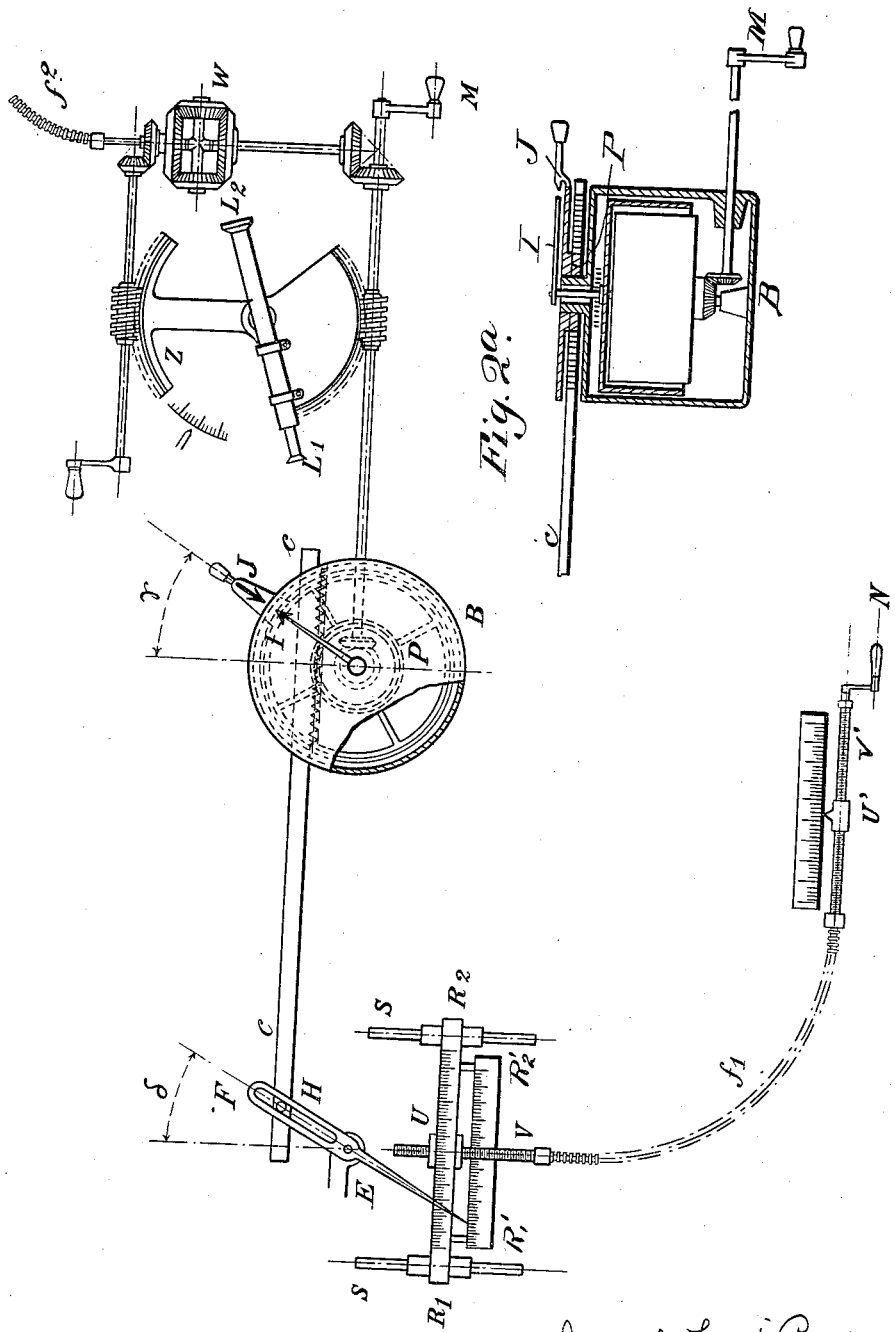

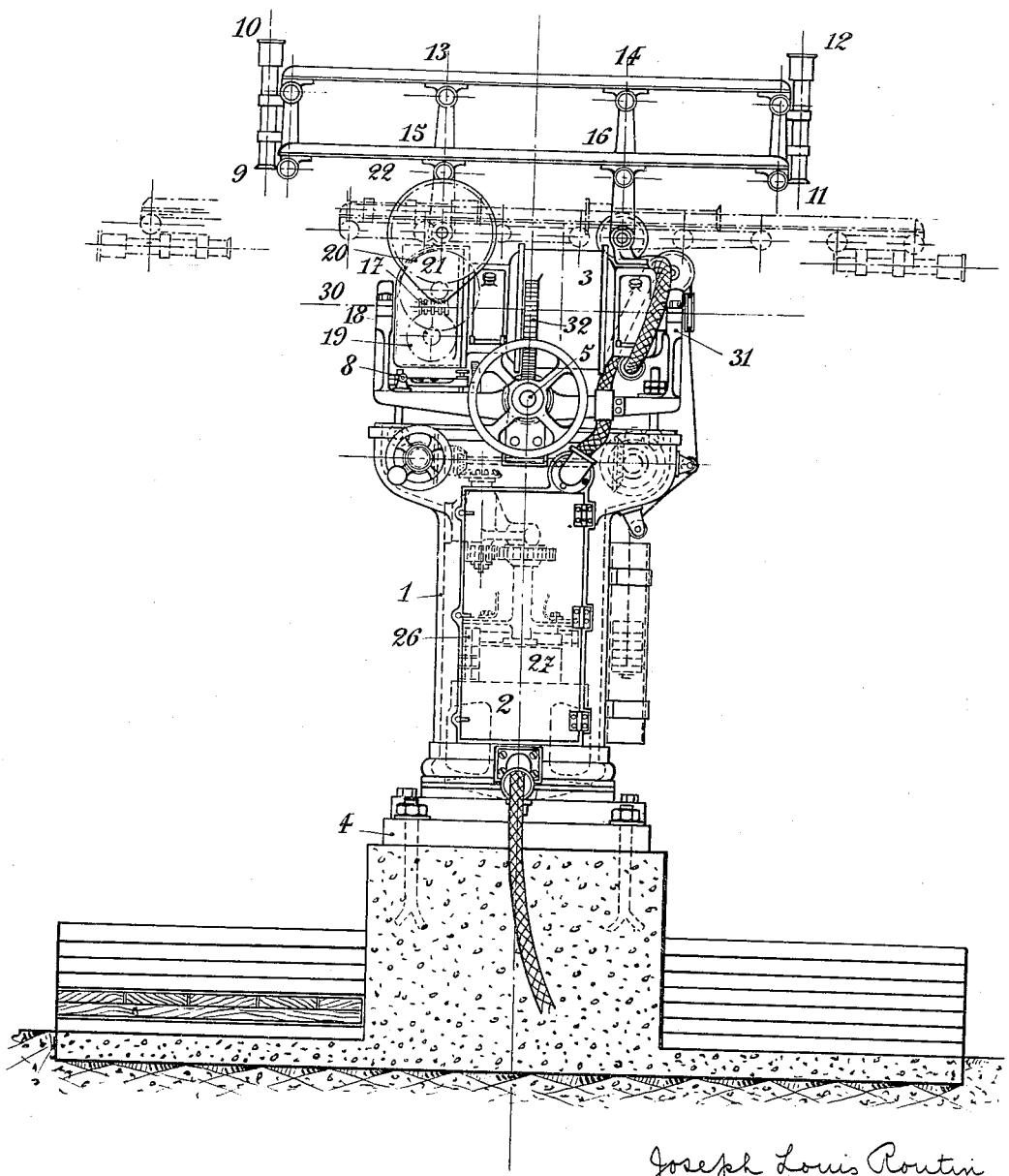

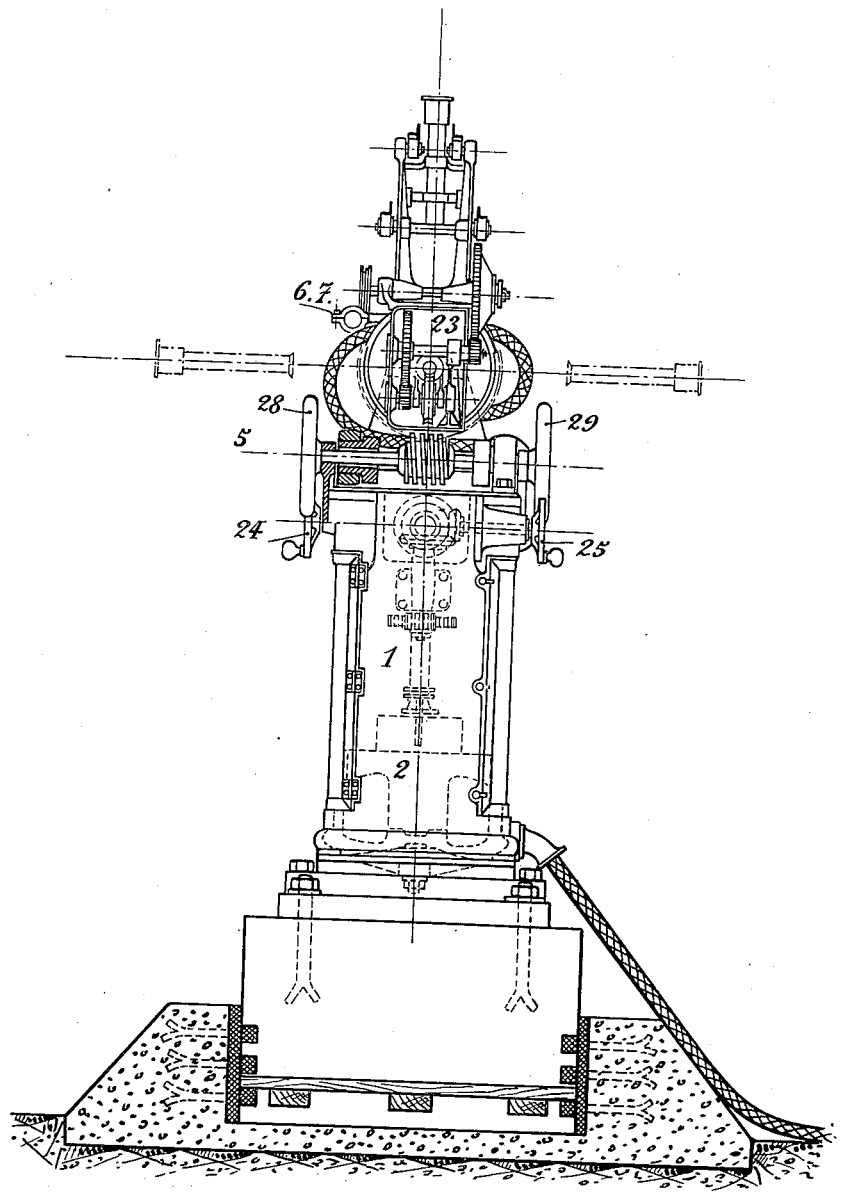

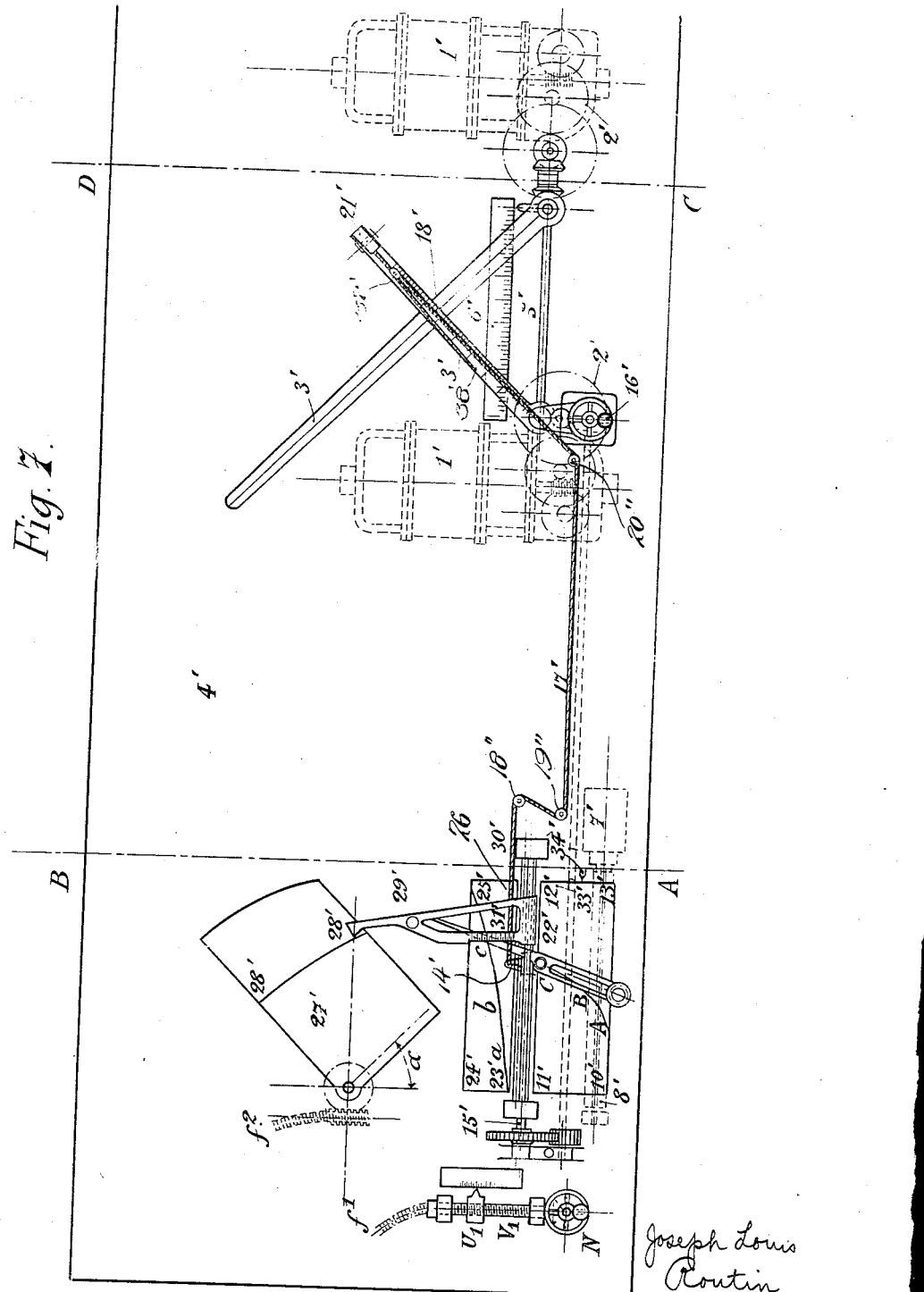

J. L. ROUTIN.
ANTI-AIRCRAFT CONTROL SYSTEM.
APPLICATION FILED JULY 23, 1917.

1,345,697.

Patented July 6, 1920.
9 SHEETS—SHEET 8.

Joseph Louis Routin,
By Mauro, Cameron, Lewis & Massie
Attorneys

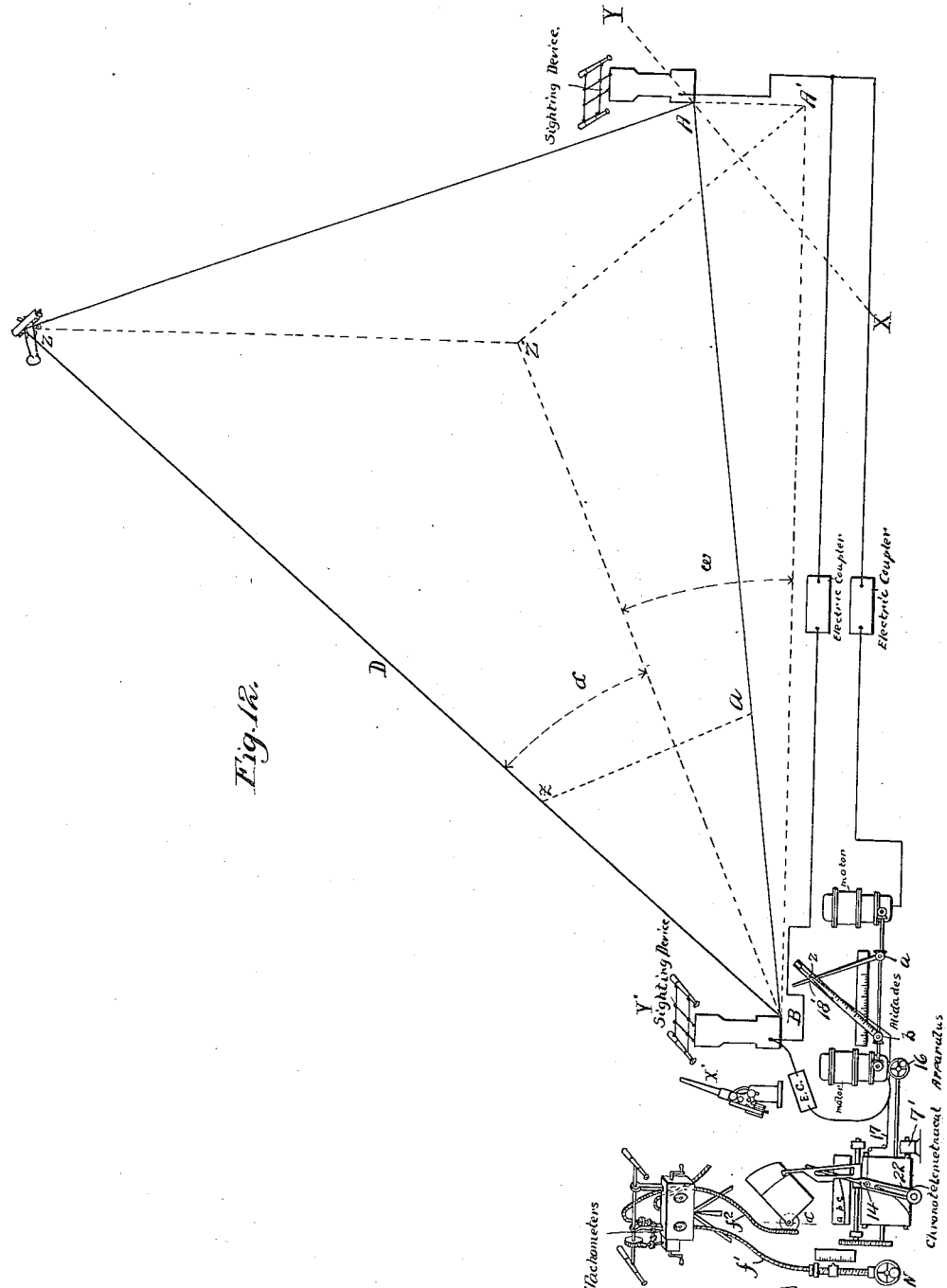

UNITED STATES PATENT OFFICE.

JOSEPH LOUIS ROUTIN, OF PARIS, FRANCE.

ANTI-AIRCRAFT-CONTROL SYSTEM.

1,345,697.  Specification of Letters Patent.  Patented July 6, 1920.

Application filed July 23, 1917. Serial No. 182,311.

*To all whom it may concern:*

Be it known that I, JOSEPH LOUIS ROUTIN, a citizen of the French Republic, residing at 2 Rue Olchanski, Paris, France, have invented a new and useful Anti-Aircraft Control System, which is fully set forth in the following specification.

This invention relates to a chronotelemetrical apparatus for use in regulating the firing of anti-aircraft guns, which shows directly and without previous calculations, the indications for regulating the time fuse of the projectile and the corrections to be made in the adjustment both in height and in direction in order to compensate for the displacement of the target during the duration of the flight of the projectile. The principal object of the invention is to provide a new combination of a telemeter and two tachometers, one giving the azimuthal and the other the zenithal speed of the target, with mechanical connections for combining the functions in the form of a graphical representation including all the elements of the problem and thus determining automatically, and preferably indicating by a signal the instant suitable for the discharge.

In order that the invention may be clearly understood, the problem of anti-aircraft firing will first be considered. Second, the principles of the invention will be explained and then the apparatus will be described and the manner in which it is employed for directing the firing explained.

I. *Problem of anti-aircraft firing.*

Regulation of the firing of anti-aircraft guns using time fuse shells requires 4 operations, namely:—

1. Regulation for the height,
2. Regulation of the fuse,
3. Correction of the vertical direction of aim,
4. Correction of the lateral direction of aim.

*Regulation for the height.*—To determine the sight, that is to say, the angle at which the telescope must be adjusted in relation to the axis of the gun, both the distance of the target D and the angle of altitude $\alpha$ that is to say the angle which the line of sight makes with the horizontal must be known. When these two components are known it is sufficient to refer to scales set up according to the firing tables to find the corresponding elevation. But it is quite evident that the values of these components which must be taken into consideration in order to procure the right elevation are not the values $D_o$ and $\alpha_o$ which are read at the moment of taking the necessary measures for preparing to discharge the gun, but those which (assuming the gun to be correctly pointed) correspond to the exact moment at which the projectile will reach the target. The values read $D_o$ and $\alpha_o$ must therefore be corrected for the variations of each component during the time T which elapses between the moment of making the observations and that at which the projectile will reach the target.

This time T includes two distinct intervals separated by the moment of the discharge of the shot, namely:

(*a*) The time $t_1$, required for reading $D_o$ and $\alpha_o$ to determine the height according to the scale, fix the elevation, correct the adjustment of the telescope in relation to the axis of the gun, regulate the fuse and load the gun.

(*b*) The time $t_2$ taken by the projectile to reach its objective.

In order to fire methodically it is indispensable to maintain the same value for $t_1$. This interval is fixed by adding a margin of from 1 to 2 seconds to the time required for effecting the above operations.

*Regulation of the fuse.*—For regulating the fuse it is sufficient to know the time $t_2$ which the projectile takes to traverse the distance D. Theoretically this time is a function of both D and $\alpha$; but in practice it may generally be admitted that it is only a function of the single variable D.

*Correction of the vertical aim.*—At the moment of the discharge of the shot the telescope is pointed at the position occupied by the target at the time $t_1$. In order to take into account the displacement of the object during the time $t_2$ the axis of the gun must be displaced through a certain angle ε. In order to compel the gunner to effect this operation the pointing telescope is adjusted in relation to the axis of the gun through an angle —ε. This operation is effected by correcting on the one hand its adjustment in height and on the other hand its lateral adjustment.

The time being designated by $t$ and the speed $\left(\frac{d\alpha}{dt}\right)_o$ being supposed constant during the duration T measured at the time $t=o$, the correction for the pointing in height is given by the expression $t_2\left(\frac{d\alpha}{dt}\right)_o$. It requires the measure of a new quantity, that is, the angular speed $\frac{d\alpha}{dt}$ which is substantially equal to the zenithal angular speed.

*Correction of the lateral aim.*—Independently of the causes which make the drift vary in the case of shooting at fixed targets, it is necessary to be able to take into consideration the component of the speed of the target following the normal to the vertical plane which passes through the line of sight. The dihedral angle made by this plane with a vertical plane passing through the eye of the observer and taken as plane of origin being designed by ω. Assuming that the azimuthal speed $\left(\frac{d\omega}{dt}\right)$ measured at the time $t=o$ remains constant during the time T the angular correction for the lateral pointing to take into account the speed of the target is given by the expression $t_2\left(\frac{d\omega}{dt}\right)_o$. It requires the measure of a last quantity, viz. the azimuthal speed of the target $\frac{d\omega}{dt}$.

It is evident, that in assuming for the aerial objective an angular velocity substantially constant, one can realize only a first approximation. If it is desired to take account of the variation of this angular velocity one would be led to formulæ more complex as established by the calculus hereinafter when the problem is considered with more generality. The calculus will permit furthermore of taking account in a clearer manner of the significance which it is necessary to attribute to the symbols δ and σ.

With a view of explaining the corrections to be applied in aiming at an aerial target, reference is had to mathematical diagrams (Figures 1ª and 1ᵇ).

In Fig. 1ª, $Z_1$ designates the position of the aerial target in the plane of sight $P_1$ at the time when the projectile is fired. $Z_2$ is the position of the same target in the plane of sight $P_2$ at the time when the projectile attains its object.

At the moment of departure of the projectile the telescope B is pointing at $Z_1$, whereas it should be pointing toward $Z_2$. The axis of the gun should therefore be displaced through a certain angle in relation to the axis of the telescope. With the devices in actual use one can only adjust the telescope in relation to the piece through angle δ obliging the gunner to effect the correction himself. The adjustment of the telescope is obtained by correcting on the one hand its adjustment in direction by an angle δ, and on the other hand its adjustment in height by an angle σ; δ being the dihedral angle formed by the two planes of sight $P^1$ and $P^2$ and σ the difference of sights $\alpha_2 - \alpha_1$.

In order to determine δ and σ one may employ a tachometer or a goniometer, but whatever procedure followed, one will be obliged to introduce one extrapolation in order to deduce from the measurements made at time $t=o$ the angular displacements of the objective from the time the projectile was fired up to the time when the projectile attains the object. It will be assumed for this extrapolation that, during the time T, the real position of the objective may be replaced by that of an objective which has a uniform rectilinear movement following the tangent to the real trajectory at the time $t=o$.

*Determination of σ.*

Referring to Fig. 1ᵇ, designate by B', the horizontal projection of the telescope and the piece; $Z'_o$, $Z'_1$, $Z'_2$, the horizontal projections of the objective after times $t=o$, $t=t_1$, and $t=T$; $D'_o$, $D'_1$, $D'_2$, the projections of distances after times $t=o$, $t=t$, and $t=T$; $\theta'_o$, $\theta'_1$, $\theta'_2$ the projections of angles of route after the respective times above; ω the dihedral angle made by the vertical plane which passes through the line of sight with any vertical plane passing through the axis of the telescope and taken as a place of origin; $\left(\frac{d\alpha}{dt}\right)_o$, $\left(\frac{d\alpha}{dt}\right)_1$, zenithal angular velocities at the time $t=o$ and $t=t_1$; $\left(\frac{d\omega}{dt}\right)_o$, $\left(\frac{d\omega}{dt}\right)_1$, azimuthal angular velocities at the time $t=o$, $t=t_1$.

It is assumed for simplifying the formula, that the height H of evolution of the objective during the time T does not vary. Also assume that one turns onto the plane of sight corresponding to time $t=t_1$, the planes of sight correspond to the times $t=0$ and $t=T$ by rotating them about the vertical which passes through the point $B^1$.

$B''$ the vertical projection of the telescope and of the piece, $Z''_0$, $Z''_1$, $Z''_2$, the positions of the objective at the times $t=0$, $t=t_1$ and $t=T$ after the planes have been made to coincide; $V'$ the horizontal component of the airplane velocity; $V''_0$, $V''_1$, the projections of the airplane velocities on the planes of sight corresponding to times $t=0$ and $t=t_1$.

Then $\sigma = \alpha_2 - \alpha_1 = Z''_1 B'' Z''_2$
and $$\sin \sigma = \frac{D' - D'_1}{V \cos \theta_0} \cdot \frac{D^2_0}{D_1 D_2} \cdot \left(\frac{d\alpha}{dt}\right)_0 \quad (1)$$

The formula may be derived in the following manner:

From Fig. 1$^b$ the quantities $D'_2$ and $D_2$ and $D'_1$ and $D_1$ have the following relation:

$$D'_1 = D_1 \cos \alpha_1$$
$$D'_2 = D_2 \cos \alpha_2$$

Also:

$$\left(\frac{d\alpha}{dt}\right)_0 = \frac{V''_0 \sin \alpha''_0}{D_0}$$

$$\left(\frac{d\alpha}{dt}\right)_1 = \frac{V''_1 \sin \alpha''_1}{D_1}$$

Suppose the airplane to be traveling in any direction whatever, D being the distance of the airplane and $\alpha$ the angle made by the line joining the air-plane with the observer. In Fig. 1$^b$, $B''Z''_0$ will be D. Then $D \sin \alpha = H$. Differentiating this expression $$\frac{dD}{dt} \sin \alpha + D \cos \alpha \frac{d\alpha}{dt} = 0$$

$$\frac{d\alpha}{dt} = -\frac{\sin \alpha}{D} \cdot \frac{1}{\cos \alpha} \cdot \frac{dD}{dt}$$

Taking $\frac{d\alpha}{dt}$, at the time $t=0$ $$\left(\frac{d\alpha}{dt}\right)_0 = -\frac{\sin \alpha_0}{D_0} \cdot \frac{1}{\cos \alpha_0} \cdot \frac{dD_0}{dt}$$

Since $\sin \alpha_0 = \frac{H}{D_0}$ and $\frac{dD_0}{dt} \cdot \frac{1}{\cos \alpha_0} = V''_0$ $$\left(\frac{d\alpha}{dt}\right)_0 = -\frac{H}{D_0} \cdot \frac{V''_0}{D_0} = \frac{H V''_0}{D^2_0} \quad (2)$$

In a similar manner may be derived $$\left(\frac{d\alpha}{dt}\right)_1 = -\frac{H}{D_1} \cdot \frac{V''_1}{D_1} = \frac{H V''_1}{D^2_1} \quad (3)$$

Combining (2) and (3) and substituting the value of $H = \frac{D^2_0}{V''_0}\left(\frac{d\alpha}{dt}\right)_0$ from equation (2)

$$\left(\frac{d\alpha}{dt}\right)_1 = \frac{V''_1}{V''_0} \cdot \frac{D^2_0}{D^2_1}\left(\frac{d\alpha}{dt}\right)_0 \quad (4)$$

From Fig. 1$^b$, $D_2 \sin \sigma = Z''_1 Z''_2 \sin \alpha_1 =$ $FV'' \sin \sigma_1$, where $V''_1$ is the average horizontal velocity of the airplane during the time interval $f$, so that $fV''_1 = Z''_1 Z''_2$. Then $$\sin \sigma = \frac{fV''_1}{D_2} \sin \alpha_1 \quad (5)$$

For $\sin \alpha_1$ in (5) substitute its value taken from equation (3) noting that $$\frac{H}{D_1} = \sin \alpha_1$$

$$\sin \sigma = \frac{fV''_1}{D_2} \cdot \frac{D'}{V''_1} \cdot \left(\frac{d\alpha}{dt}\right)_1 \quad (6)$$

For $\left(\frac{d\alpha}{dt}\right)_1$ in (6) substitute its value from (4), then $$\sin \sigma = \frac{fD_1}{D_2} \cdot \frac{V''_1}{V''_0} \cdot \frac{D^2_0}{D^2_1} \cdot \left(\frac{d\alpha}{dt}\right)_0$$
$$= \frac{fV''_1}{V''_0} \cdot \frac{D^2_0}{D_1 D_2} \cdot \left(\frac{d\alpha}{dt}\right)_0 = \frac{f'D^2_0}{D_1 D_2}\left(\frac{d\alpha}{dt}\right)_0$$

where $f' = f\frac{V''_1}{V''_0}$, and would be equal to $f$ if $V''_1 = V''_0$.

Again, a value may be taken for $f'$ which depends upon the average speed $V$ during the interval of traverse of the distance $Z''_1 Z''_2$. From Fig. 1$^b$ it is seen that $Z''_1 Z''_2 \cos \theta_0 = D'_2 - D'_1$, so that the time required for the airplane to travel this distance with the average speed V is $$\frac{D'_2 - D'_1}{V \cos \theta_0}$$

Accordingly, one may write $$\sin \sigma = \frac{D'_2 - D'_1}{V \cos \theta_c} \cdot \frac{D^2_0}{D_1 D_2} \cdot \left(\frac{d\alpha}{dt}\right)_0 \quad (7)$$

*Determination of $\delta$, referring to Fig. 1$^b$.*

$$\left(\frac{d\omega}{dt}\right)_0 = \frac{V' \sin \theta_0}{D'_0} = \frac{A'B'}{D'_0} \times \frac{V'}{D'_0} \quad (1)$$

$$\left(\frac{d\omega}{dt}\right)_1 = \frac{V' \sin \theta_1}{D'_1} = \frac{A'B'}{D'_1} \times \frac{V'}{D'_1} \quad (2)$$

From (1)

$$A'B' \times V' = (D'_0)^2 \cdot \left(\frac{d\omega}{dt}\right)_0$$

Substituting this value in (2), $$\left(\frac{d\omega}{dt}\right)_1 = \left(\frac{D'_0}{D'_1}\right)^2 \cdot \left(\frac{d\omega}{dt}\right)_0 \quad (3)$$

From (2)

$$\sin \theta_1 = \frac{D'_1}{V'} \cdot \left(\frac{d\omega}{dt}\right)_1$$

Substituting the value of $\left(\frac{d\omega}{dt}\right)_1$ from (3)

$$\sin \theta_1 = \frac{(D'_0)^2}{VD_1} \cdot \left(\frac{d\omega}{dt}\right)_0 \quad (4)$$

Considering the triangle $B'Z'_1Z'_2$ $$\frac{\sin \delta}{V'f_2} = \frac{\sin \theta_1}{D'_2}$$

From which $$\sin \delta = \frac{V'f_2 \sin \theta_1}{D'_2}$$

For $\sin \theta_1$ substitute its value from (4)

$$\sin \delta = f_2 \frac{(D'_1)^2}{D'_1 D'_2} \cdot \left(\frac{d\omega}{dt}\right)_o \quad \text{------} (5)$$

$f_2$ stands for the time of flight of the projectile and may be replaced by the expression $$\frac{D'_2 - D'_1}{V \cos \theta_o}$$

Again $$\frac{(D'_1)^2}{D'_1 \times D'_2}$$

is the horizontal projection of the expression $$\frac{(D_1)^2}{D_1 \times D_2} \times \frac{\cos \alpha^2_o}{\cos \alpha_1 \times \cos \alpha_2}.$$

Where the angular intervals are small, this expression may be written without sensible error as $$\frac{D^2_1}{D_1 \times D_2}.$$

Equation (5) may be then witten—

$$\sin \sigma = \frac{D'_2 - D'_1}{V \cos \theta_o} \times \frac{D^2_1}{D_1 \times D_2} \times \left(\frac{d\omega}{dt}\right)_o \quad -- (6)$$

The conclusion from the foregoing is that regulation of the firing of anti-aircraft guns requires simultaneous determination:—

Of the distance of the target D,
Of the angle of sight $\alpha$,
Of the time of passage $t_2$,
Of the correction of the vertical aim $t_2$ $$\left(\frac{d\alpha}{dt}\right)_o,$$

Of the correction of the lateral aim $t_2$ $$\left(\frac{d\omega}{dt}\right)_o.$$

In order to determine the correct aim, the telemetrical operation must be completed by a chronometrical operation allowing the results furnished by the previous observations to be advantageously extrapolated.

To determine the corrections in the angle of sight which must serve to define the proper aim, as well as the corrections in adjustments of the telescope, two tachometrical measures are further required, one giving the azimuthal speed of the target and the other the zenithal speed.

It is evidently of the greatest use to reduce as much as possible the time $t_1$, not only to increase the rapidity of the firing, but further that the results may give valuations as near as possible to the true values. In order to reduce $t_1$ to the minimum, all the calculations are arrived at mechanically, providing suitable connections between the observation instruments. The apparatus which forms the subject of the invention shows instantaneously at any moment all the readings. It consists of the combination of a telemeter, an azimuthal tachometer and a zenithal tachometer, with an apparatus which shows the extrapolation graphically.

In order that the invention may be more readily understood, reference is had to the accompanying drawings, in which—

Fig. 1 is a graph giving distances in time functions;

Figs. 1ª and 1ᵇ are explanatory diagrams;

Fig. 2 is a diagrammatic view of a tachometric device for determining the extrapolated angle of sight;

Fig. 2ª is a sectional detail view of the tachometer;

Fig. 5 is a view in elevation showing a sighting device adapted to transmit the angular displacements by means of an electric coupling such as described in my French Patent No. 449,718 of Dec. 30, 1911;

Fig. 6 is a vertical sectional view on line 6—6 of Fig. 5;

Fig. 7 is a plan view showing at the right alidades operated by motors controlled by sighting devices at the transmitting stations and at the left chronotelemetrical apparatus;

Fig. 12 is a schematic view showing the general plan and arrangement of the apparatus.

II. *Principles of the devices employed.*

Figure 1:
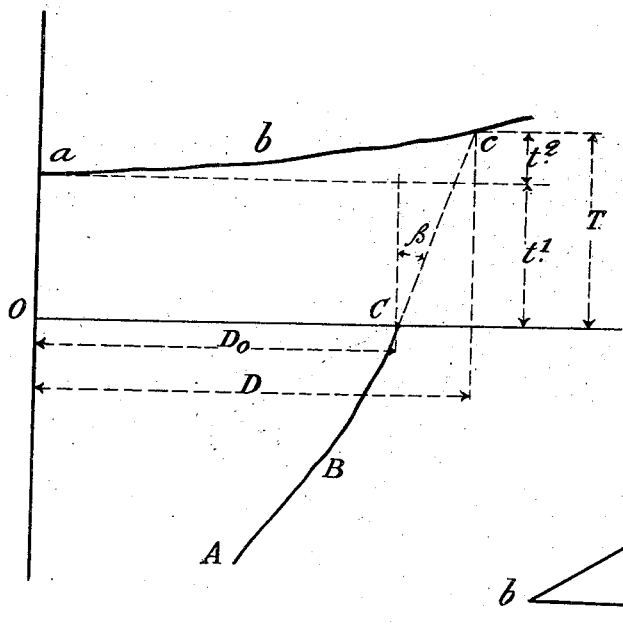

*Determination of the extrapolated distance D and of the fuse regulation $t_2$.*—Let ABC be the graph which gives the distance in time functions (see Fig. 1). (It will be explained farther on how this graph is obtained).

Let $D_o$ denote the distance measured at the time $t=o$, C the corresponding point and $\beta$ the angle which the tangent to the curve of the distances makes at this point with the vertical. The component of speed in the direction of the line of sight, that is to say, the speed of approach of (or retreat of) the target is evidently equal to $\tan \beta$ and it can be admitted that at the time T the distance D will be given with sufficient approximation by the equation $$D = D_o T \tan \beta$$

On the other hand, for every value of $t$ greater than $t_1$ the distance $d$ traversed by the projectile may be expressed at any instant by a given function of the only variation $t$ (as in practice this distance is generally independent of the angle of sight). $d$ may therefore be taken equal to $f(t)$. Assuming this curve traced by $abc$ it is seen that it will be sufficient to prolong the tangent at C to the curve which gives the distances to the target up to its intersection at $c$ with the curve which gives the distances of the projectile in order to have at once and without having to make any calculation.

1. The distance $D = D_o T \tan \beta$ which should be taken into consideration in order to determine the height, while taking into account besides the correction which must be made in the angle of sight.

2. The value of the time $t_2$ for which will be had $$D_o + (t_1 + t_2) \tan \beta = f(t_2)$$

that is to say, the fuse setting which will cause the explosion of the projectile at the very moment that it reaches the target.

3. The value of the time T.

To facilitate explanations the device of which the principle has just been disclosed will be hereafter referred to under the name "telechronograph."

*Determination of the extrapolated zenithal angle.*—In order to determine the aim from the tables it is necessary as has already been said to know not only D but also the extrapolated angle of sight $$\alpha = \alpha_o + T \frac{d\alpha}{dt}.$$

Fig. 2 shows the diagram of the apparatus which allows $\alpha$ to be directly obtained without having to make any calculation. A handle M serves for adjusting a telescope $L_1 L_2$ arranged to measure the angle of sight $\alpha$, and a tachometer B is so constructed that the angular displacement $\nu$ of its index I is proportional to the zenithal angular speed $\frac{d\alpha}{dt}$.

Behind the tachometer is placed a pinion P mounted on an axle, which is alined with that which carries the index hand of the tachometer. This pinion is integral with a second index hand J which is intended to be kept constantly opposite I. By displacing the rack C which moves horizontally is moved by the pinion P; the pin H integral with C engaging in the slide F moves the lever F E K around the point E. When the speed is *nil* the three indexes I J K are vertical. When J is moved through an angle $\nu$ the lever F E K turns through a certain angle designated by $\delta$. The tangent of this angle $\delta$ is evidently proportional to the displacement of the rack $c$, that is to say, to $\delta$, or to $\frac{d\alpha}{dt}$. One may then assume $$\tan \delta = \theta \frac{d\alpha}{dt}.$$

It is seen at once that it is sufficient to place a graduated scale $R_1 R_2$ parallel to $c$ at a distance from E equal to $\frac{T}{\theta}$ in order to have opposite the index K the correction $T \frac{d\alpha}{dt}$ which should be made in the angle of sight.

The displacement of the scale $R_1 R_2$ is controlled at a distance by a gunner at the telechronograph station. For this purpose the scale $R_1 R_2$ arranged so as to slide along the rods S is integral with a nut U operated by the screw V. At the telechronograph station (see Fig. 7) a screw $V^1$ identical with V draws a nut U' having an index which moves along the time scale. The screws V $V^1$ are connected by a flexible connection $f_1$. The operation is effected by means of a small crank N. The gunner's function consists in keeping the index finger carried by $V^1$ opposite the scale mark corresponding to the time T.

It is only necessary, to avoid any calculation to adjust in the proper direction of the angle $T \frac{d\alpha}{dt}$ the dial on which the angle of sight is read. This operation is conveniently effected by turning the handle X which by means of the worm Y rotates the sector Z integral with the dial. The readings on this dial will then give directly the angle $$\alpha = \alpha_o + T \frac{d\alpha}{dt}.$$

This corrected reading will be mechanically transmitted to a sector arranged at the telechronograph station, for instance, by means of a flexible shaft $f_2$ driven by the satellites of the differential gear W. It will be shown hereinafter in the detailed description of the receiving station how the addition of this sector enables the aim to be directly read without any loss of time and without possible error.

Determination of the corrections to be made in the vertical aim and in the lateral aim.

The correction $t_2 \frac{d\alpha}{dt}$ in the vertical aim is obtained by employing the device just described for determining the product $T \frac{d\alpha}{dt}$. It is evidently sufficient to add a second scale $R^1_1 R^1_2$ placed at a distance $\frac{t_2}{\theta}$ from the point E. It is at once seen that the distance of the two scales $$\frac{T-t_2}{\theta}=\frac{t_1}{\theta}$$

being constant it will be sufficient to mount the second on the first.

The correction $t_2\frac{d\omega}{dt}$ is determined by means of a device in all points similar to that just described, the handle M then acting on a telescope arranged to measure the azimuthal angle ω.

*Telemeter.*—In order to trace precisely the graph ABC which gives the distance of the target in time functions, a telemeter with a large base for continuous indication should be employed.

Figure 3:
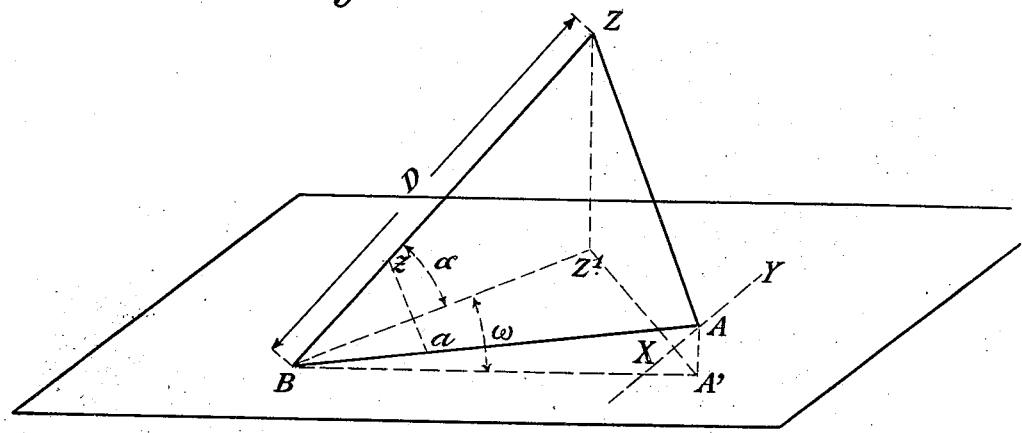

In Fig. 3 which shows the principle of this apparatus B denotes the battery station, A an auxiliary station, Z the target. The distance BA being about 3 kilometers it is required to construct automatically at the battery station a triangle B*az* similar to the triangle BAZ on a base B about 15 cms. long. The distance BZ is then read directly on the alidade B*z* on the scale of 1/20,000.

The direction AB is known, the direction BZ is obtained by direct sight. It is therefore sufficient to be able to maintain at the battery station a constant parallel between the alidade *az* and the direction AZ. For this purpose, at the auxiliary station A, a telescope is mounted so as to be able to turn around the line BA and on the other hand around an axis XY perpendicular to the plane BAZ. It will be assumed first that the rotation around BA is obtained by any means. The rotation around XY is obtained by means of an electric coupling which for instance may be that described in French Patent No. 449,718, December 30, 1911, to Routin, and additions, which allows synchronous movement between the alidade B*az* placed at the battery station and the telescope of the station A.

Figure 4:
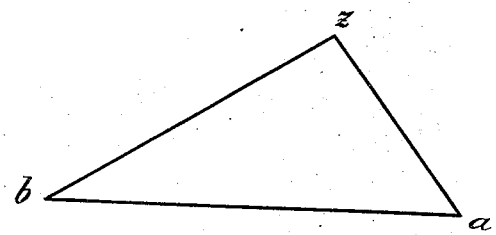
Figs. 3 and 4 are explanatory diagrams.

It is well, both for the convenience of the readings and to facilitate the construction of the apparatus, to lay the triangle B*az* on a horizontal plane. This result is obtained in a very simple manner by installing at B a second transmitting station and by installing at the receiving station (which is near the battery) two alidades *bz* and *az* (see Fig. 4) the triangle *abz* remains constantly similar to the triangle ABZ. It will be shown farther on how the distance *bz* is indicated on the graph ABC. In case the auxiliary station is itself provided with a battery it will be sufficient to install there a second double receiver to obtain the distance AZ which effects the firing from the point A.

The use of a large base has great advantages with regard to precision; by using, as aforesaid, the coupling described in my French Patent No. 449,718, December 30, 1911, one can very easily attain to an angular precision corresponding to 1/1,000. On the other hand it has often been correctly pointed out that when a bistatic telemeter is used there is a risk of committing errors in the designation of the target whenever several targets are present at the same time and when they are so arranged that they are not seen in the same order by each of the observation stations. To avoid this difficulty one or other of the methods hereinafter described will be employed.

If several targets are present during the night the simplest method consists in employing a projector arranged so as to be controlled by the transmitting station installed near the battery which in this case is constructed so as to transmit both the rotary movement around AB and the orientation of the line of sight in the plane BAZ. The commandant of the battery after having selected from among the different objectives simultaneously appearing that which he takes as a target will illuminate it with his projector and will thus designate it without any possibility of error to the observer of the auxiliary station A.

If a plurality of objectives appear during the day, in order to designate that which is to be chosen as a target, recourse will be had to the dihedral angle which the plane BAZ with any original plane passing through BA. This designation may be made either by telephone communication or automatically by employing any of the known means; in particular recourse can be had to the electric coupling described in the aforesaid Patent No. 449,718, which would enable the telescope of the auxiliary station A to be moved synchronously so as to keep it constantly in the plane defined in the line BA and the line of sight BZ. The observer placed in the auxiliary station would then in this case only have to deal with the orientation of the line of sight in the said plane.

With a view of giving a general outline of the system, reference is had to Fig. 12 where is shown an aerial object Z, a battery station B and an auxiliary station A distant therefrom about three kilometers and at a slight elevation above the level of B. Each of the stations is provided with a sighting device adapted to be connected by an electric coupler such as described in French patent to Routin No. 449,718, of Dec. 30, 1911, for the purpose of automatically keeping the line of sight of each sighting device in the plane of sight BZA. For the purpose of automatically determining the range D, a range-finding device is employed which, as shown, includes two alidade arms 3 pivoted at *a* and *b* and adapted to follow the changes in deviation of the lines of sight at the two stations. These movements are effected by motors controlled through electric couplers which respond to the movements of the sighting devices. The two alidade arms thus constitute two sides of a triangle similar to BZA, the base of which is some aliquot part of the distant BA as measured on a scale shown back of the arms.

In order to obtain in time functions a graph of the range as determined by the alidades and from this graph extrapolate the range which the target will have after a fixed time $t_1$ and also the variable time $t_2$ of flight, a chronotelemetrical apparatus is provided. This apparatus in brief includes a recording surface caused to move at a uniform speed by a clock or constant speed motor 7'. A tracing point is supported in a carriage 14 which moves transversely of the traveling surface. This movement is effected by manipulating hand-wheel 16 as explained in the detail description and the movement is controlled through a flexible connection 17 between the carriage 14 and the shifting point 18' where the alidade arms intersect. The tracing point, therefore, traces a curve the horizontal ordinate of which at each instant is the distance $D_o$. This curve is the graph ABC of Fig. 1. The tangent of this curve at the point of generation is indicated by means of a pointer 22 pivoted on the carriage 14. This pointer extends over a plate provided with a curve $abc$ explained above. Where this pointer cuts curve $abc$ the abscissa of this point gives the extrapolated range D and the ordinate of this point gives the time $t_2$. Suitable scales are provided for reading off these values.

As stated above, at the moment of discharge of the shot, the telescope of the sighting device at firing station B is pointed at the position occupied by the target at the time $t_1$. In order to correct for the displacement of the target during the time $t_2$ of flight of the projectile, both in zenithal displacement $\alpha$ and azimuthal displacement $\omega$, two tachometers combined in a unitary structure are located at or near the firing station B. An observer at the tachometers maintains the sight of one or the other of the tachometer telescopes on the moving target, thereby obtaining the speed $\frac{d\alpha}{dt}$, for example, while an observer at the telechronotelemetrical apparatus operates a timing device N connected by power cable with a device associated with the tachometer for multiplying $t_2$ by $\frac{d\alpha}{dt}$ as will be explained below. The correction $t_2 \frac{d\alpha}{dt}$ is manually applied through a cable $f_2$ to a sector giving directly the extrapolated zenithal angle $\alpha$.

The correction for the azimuthal angle $\omega$ is obtained by the companion tachometer in a similar manner.

The extrapolated values D for range, $\alpha$ and $\omega$ for elevation and direction, and $t_2$ for setting the fuse, and which are obtained without calculations, are transmitted periodically to the gunner.

Figs. 5 and 6 show how the transmitting stations may be developed by employing the electric coupling previously referred to.

Each station includes:

A metal column 1, containing the transformer 2 and supporting the motor 3.

The column can be turned horizontally by rotating it around a vertical axis on the fixed base 4.

The carriage in which the motor is housed can on the other hand be set in a vertical plane by rotating it around a horizontal axis 5.

These two orientation movements enable the motor shaft to be placed in the direction of the line which passes through the two observation posts.

This may be done either by direct sight by placing a telescope in the collars 6, 7 or by a topographical method by employing the level 8, arranged so that the inclination of the motor shaft to the horizontal can be measured.

Each station is furnished with two telescopes (9, 10) and (11, 12) supported by a jointed parallelogram 13, 14, 15, 16 mounted on the frame of the motor.

This special mounting allows of passing without difficulty to the zenithal aim by rotating the telescope around an imaginary axis passing approximately through the ears of the gunner. The gunner uses either of the telescopes according to the position of the target; he has, besides only to change his place in the case of the target passing over the vertical plane perpendicular to the horizontal projection of the line which connects the two stations.

The rotation of the motor produces the distortion of the parallelogram and the modification of the angle of sight in the sight plane common to the two stations by means of the screw 17 and the toothed wheels 18, 19, 20, 21, 22, this last being integral with the arm 13, 15. All these gearings are contained in the casing 23, integral with the motor.

To start the motor one of the operating wheels 24 or 25 is turned, which causes the displacement of the brushes 26 on the collector 27.

To displace the plane of sight one of the wheels 28 or 29 is turned, thus causing the rotation of the whole of the motor in the bearings 30, 31 by the action of the toothed sector 32 which engages with the screw 33.

The control of the telescope by means of a parallelogram allows of direct sighting from the horizon to the zenith, but the apparatus could evidently be provided with a known type of indirect sighting telescope.

Figure 8:
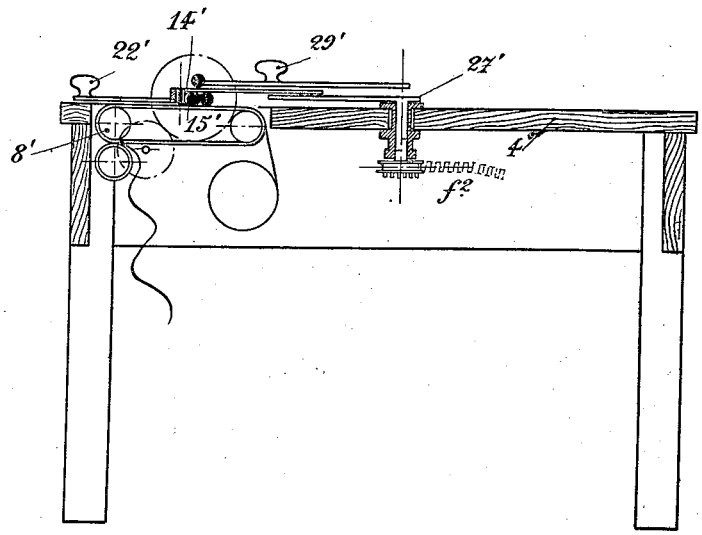
Fig. 8 is a vertical sectional view of Fig. 7 on the line A B.
Figure 9:
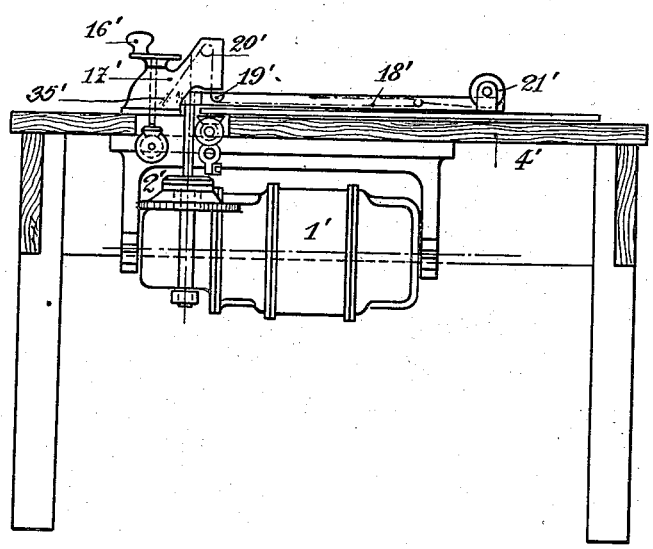
Fig. 9 is a similar view of Fig. 7 taken on the line C D.

Figs. 7, 8, 9 show a double receiver; Fig. 7 is a plan view; Fig. 8 is a section on A B showing the telechronograph and Fig. 9 a section on C D showing one of the receivers and the alidades. This station comprises two similar combinations each composed of—

A motor 1',

A series of gears 2' identical with those of the transmitting station,

An alidade 3'.

One of the motors is connected to the transmitting station situated near the battery, the other being operated from the auxiliary station enabling the position of the target to be defined in bipolar coördinates in the common plane of sight.

The two motors are fixed to the lower part of a horizontal plate 4 above which the alidades are displaced.

By displacing one of the alidades (actuated by a pinion which can slide along the grooved shaft 5') the distances of the axes around which the alidades turn is regulated as desired; thus a fixed graduation, on the scale of the twenty thousandth, can be retained, whatever the distance between the two stations. The distance between the axes of the alidades is read on the scale 6'.

In order to be able to bring the alidades and the telescopes easily into unison, adjustable friction members are provided in the mechanical transmissions, and stoppage at the extreme positions of the alidades and of the telescopes is obtained by suitably placed fixed abutments. It is consequently evidently sufficient to let the motors rotate for a time corresponding to an angular separation of 180° to be certain that alidades and telescopes are brought into unison on the abutments.

The telechronograph includes: a clockwork movement 7' (or a constant-speed electric motor) which by means of the barrel 8' draws a strip of paper 10', 11', 12', 13' on which a pen rests carried by the carriage 14'. This carriage is integral with a nut mounted on the screw 15'. To displace the carriage 14' along the screw 15' the handle 16' is operated. To the carriage 14' is fixed a cord 17' which, for the sake of clearness, is diagrammatically shown in Fig. 7 as passing over suitable guide pulleys 18'', 19'', 20'', around a tension pulley 37' mounted on the alidade arm 3', and has its opposite end made fast at 38' to the alidade arm. An index finger 18' is secured to the cord and moves over the graduations. In Fig. 9 this cord is shown passing to a pulley 35' thence over pulleys 20', 19' and around the free pulley 37'. Between pulleys 19' and 20' the cord is directed in the axis of rotation of the alidade; it is kept constantly stretched by the spring drum 21' integral with the alidade.

To trace on the strip of paper the diagram of the distances ABC (see above) it is sufficient to actuate the handle 16 so that the index point 18' is at the intersection of the guide lines of the two alidades.

In order to obtain conveniently the direction of the tangent at C to the curve ABC the carriage 14' carries a scale 22' which can turn around a vertical axle passing through C.

A plate, 23', 24', 25', 26' is supported above the surface of the traveling sheet 10', 11', 12', 13' and beyond the path of the carriage 14' which carries the pen for tracing the distance curve ABC. On this plate is placed a curve $abc$ giving on its horizontal axis of reference extrapolated distances D and on its vertical axis times $t_2$ of flight of the projectile. The horizontal axis of reference of curve $abc$ is located at a distance from the path traced by the carriage 14 corresponding to the time $t_1$. When scale 22' is tangent to curve ABC, the extension of the scale over the plate 10', 11', 12', 13', cuts curve $abc$ at a point $c$ such that the abscissa of this point represents the extrapolated distance D and its ordinate represents the time $t_2$ of flight corresponding thereto.

The angle $\alpha$ is given by the rotation of the sector 27' rotated as previously described. On this sector are drawn to the scale adopted to the distances the equi-height curves such as 28'. The height is read at the point of intersection of the vertical passing through the point $c$ and the horizontal passing through the axis of rotation of the sector. This reading is facilitated by means of a straight edge 29 which can slide along the rod 30. The fuse setting is read on a vertical scale 31 fixed to the straight edge 29'.

In case it should be necessary to take into consideration the value of the site angle $\alpha$ in the determination of the distance $d$, it would be sufficient to trace on the plate 23', 24', 25', 26' a group of curves corresponding to the various values of $\alpha$. This might also be effected by giving the said plate a suitable inclination, only a single curve being drawn on the plate.

In order to regulate the rate of firing the strip of paper is provided with marks 33' separated by intervals equal to $t$ and which pass in front of a fixed index 34'. A gong placed near the firing officer sounds twice, the first time before the coincidence of a mark with the pointer and the second time at the exact moment that the gunners are to fire.

The screw $V^1$, the carriage $U^1$ and the handle N serve, as has been previously explained, to transmit the times $T - t_2$ and $T$ to the correction station.

Figure 11:
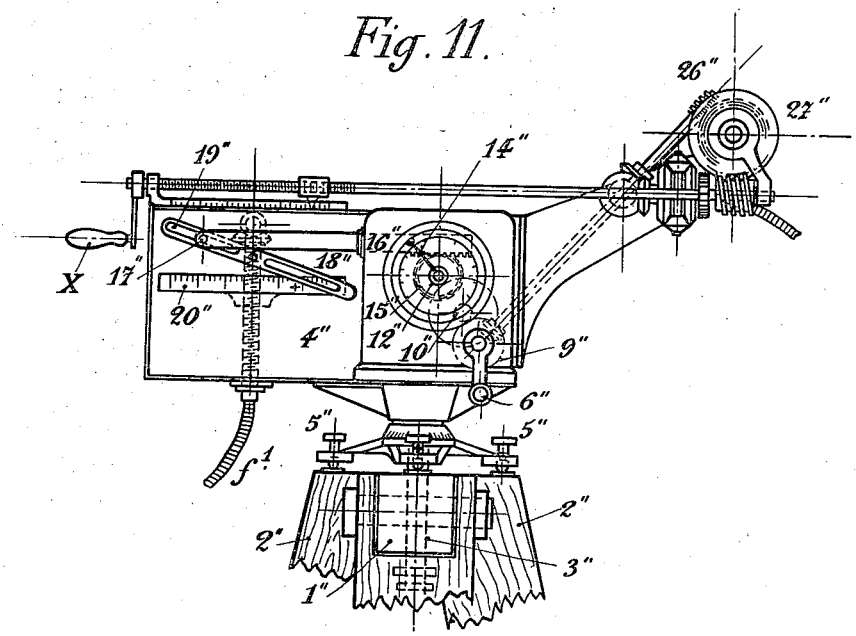
Fig. 11 is a side elevational view of Fig. 10 looking toward the left hand.
Figure 10:
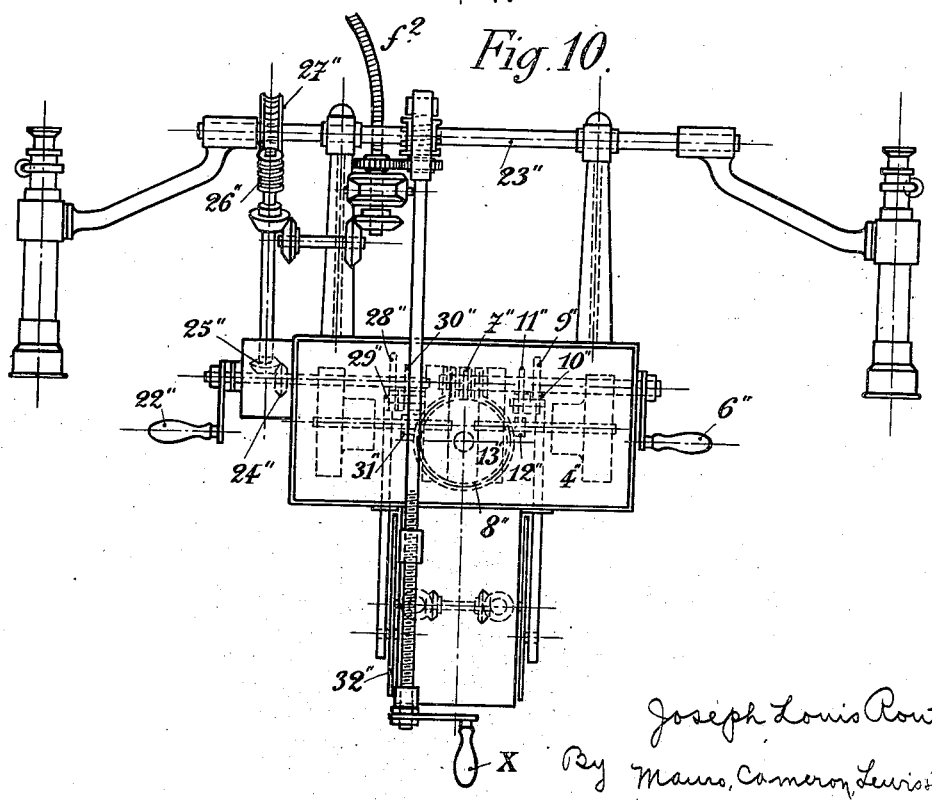
Fig. 10 is a plan view of a zenithal and azimuthal tachometer combined in a unitary structure.

In Figs. 10 and 11 are shown two tachometers combined in a unitary structure and adapted to give the azimuthal speed $\frac{d\omega}{dt}$ and correction $t_2\frac{d\omega}{dt}$ for lateral aim and also give the zenithal speed $\frac{d\alpha}{dt}$ and correction for $t_2\frac{d\alpha}{dt}$ for vertical aim as explained above under the description of Fig. 2. The two telescopes which are to remain constantly parallel are mounted on the same frame and arranged so that the direction gunner operates the whole of the framework while the second gunner moves both telescopes upward at once. Thus the work of the gunners who mutually assist one another is considerably facilitated.

In order to be easily transportable, the apparatus is dismountable in two parts, one part comprising the support 1″ provided with three stout legs 2″ provided with hinges 3″ and the other part the tachymeter mechanism inclosed in an aluminum casing 4″.

The leveling of the apparatus is effected by means of the adjusting screws 5″.

The direction gunner actuates the handle 6″ in order to operate the whole of the framework and the telescopes by means of the worm 7″ and the fixed wheel 8″ and on the other hand a first magnetic tachymeter by means of the wheels 9″, 10″, 11″, 12″. The handwheel 13″ prevents jerkiness in the operation and facilitates the readings.

The azimuthal speed of the target $\frac{d\omega}{dt}$ can thus be found at any moment by the displacement of the index finger 14″. Transmission gear comprising the pinion 15″ and the rack 16″ guiding by means of the rod 17″ the scale 18″ in which is a slideway 19″, allows this scale to be placed in such a manner as to make an angle with the vertical the tangent of which will be proportional to $\frac{d\omega}{dt}$.

The correction sought $t_2\frac{d\omega}{dt}$ is read on a horizontal scale 20″ which is displaced by means of the flexible shaft $f_1$ controlled at a distance by an assistant at the telechronograph station.

The gunner for vertical aim actuates the handle 22″ to operate the shaft 23″ on which are mounted the two telescopes by means of the pinions 24‴, 25‴, the screw 26″ and the toothed sector 27″ and a second magnetic tachometer by means of the wheels 28″, 29″, 30″ and 31″. The angular speed being thus known the term $t_2\frac{d\alpha}{dt}$ is deduced by means of mechanism in all respects identical to that just described.

The correction is read directly on the scale 32. The apparatus described is for a fixed installation suitable for instance, for the defense of places or coasts and in the latter case can equally well be employed against ironclads as against aircraft. In case of movable stations there will not always be time to install a large base telemeter and it will be necessary to use a monostatic telemeter the curve ABC will then be traced by successive points from readings of a telemeter arranged at the battery station.

*Control of firing.*—The control of the firing will require a firing officer, three assistants and four pointing gunners distributed as follows:—

For the telemeter—one pointing gunner at the battery station.

One pointing gunner at the auxiliary station.

For the receiver and the telechronograph: One assistant (No. 1) charged with following the variations of the distance on the graduated alidade and with reproducing them mechanically on the telechronograph by actuating the handle 16′.

One assistant (No. 2) who transmits to the tachymeter station the times T and $t$ by actuating the handle N.

One firing officer who sets the scale 22′, following the tangent at C, at BAC and moves the straight edge 28′ to bring its vertical edge to pass through $c$.

At the tachymeter station: One vertical aim gunner;

One direction aim gunner;

One assistant (No. 3) charged with transmitting the correction $T\frac{d\omega}{dt}$ by actuating the handle X and indicating verbally the corrections to be made in the adjustment of the telescope.

The series of the operation is as follows:

The commandant having given the order to commence firing, the firing officer announces the height and the fuse setting as soon as one of the marks 33′ comes opposite the index point 34′. At the same moment assistant No. 3 announces the corrections to be made in the adjustment of the telescope. The fuse is set, the height and the sighting telescopes of the gun are regulated, the gun is loaded and one waits till the signal to fire is given by the gong which comes automatically into action at the end of the time $t_1$. At the precise moment of firing the firing officer and assistant No. 3 make new readings which are immediately transmitted. The gun can thus be fired after each interval $t_1$.

What I claim as my invention and desire to secure by Letters Patent of the United States is—

1. Apparatus for regulating the firing of anti-aircraft guns, comprising sighting means, range-finding means controlled by said sighting means, means associated with said range-finding means for tracing the graph of said range in time functions, and graphic means including a time of flight curve for extrapolating by aid of said graph a predicted range of the target.

2. Apparatus for regulating the firing of anti-aircraft guns, comprising sighting means, range-finding means controlled by said sighting means, means associated with said range-finding means for tracing the graph of said range in time functions, graphic means including a time of flight curve for extrapolating by aid of said graph a predicted range, and for determining the time of flight corresponding to said range.

3. Apparatus for regulating the firing of anti-aircraft guns, comprising sighting means, range-finding means controlled by said sighting means, means associated with said range-finding means for tracing the graph of said range in time functions, means for extrapolating by aid of said graph a predicted range and for determining the time of flight corresponding to said range, a tachometer controlled by a sighting device maintained on the target for measuring the angular speed of said target, and speed and time controlled means for extrapolating a predicted angular displacement of the target.

4. In apparatus of the character described, the combination of a tachometer for measuring angular speed, a revoluble index hand, the tangents of the angular displacements of which are proportional to said speeds, and a time-controlled displaceable scale movable in relation to said index hand for indicating the product of speed by time.

5. Apparatus for regulating the firing of anti-aircraft guns, comprising sighting means, range-finding means controlled by said sighting means, means associated with said range-finding means for tracing the graph of said range in time functions, means for extrapolating by aid of said graph a predicted range of the target and for determining the time of flight corresponding to said range, a sighting device maintained on said target, a sector having operating connections with said device for indicating at a distance angles of sight, a tachometer controlled by said sighting device, means cooperating with said tachometer for determining the angular correction of sight for the duration of said flight, and manually-operated means for applying said corrections to said sight-indicating means.

6. In apparatus for regulating the firing of anti-aircraft guns where a plurality of objectives appear from separate stations, and for designating that object which is to be chosen as a target, means comprising a device for measuring the angle which the plane of sight common to two observers makes with a horizontal plane, and means enabling the observer at the battery post to indicate to the observer of the auxiliary post the plane of the objective to be designated.

7. Apparatus for regulating the firing of anti-aircraft guns, comprising sighting means, range-finding means, a time-controlled movable sheet, a tracing element movable over said sheet and controlled by said range-finding means to trace a graph of the range in time functions, said tracing element being provided with a tangent-indicating member, a support provided with a curve giving distances of the projectile in time functions and so positioned in respect to the range graph that the tangent to the latter graph intersects said curve in a point the ordinates of which give directly the extrapolated distance of the target and the time of flight of the projectile corresponding thereto.

8. In apparatus for regulating the firing of anti-aircraft guns, the combination of sighting means comprising two telescopes, a parallelogram frame on which they are mounted, direction pointing mechanism for moving said frame in azimuth, and vertical pointing mechanism for moving said frame in elevation; and tachometers having operative connection with said moving mechanisms to measure azimuthal and zenithal angular velocities of the target.

9. In apparatus of the character described, a transmitting station and an auxiliary station each provided with sighting means, and power connections between said sighting devices for maintaining said devices in a plane of sight common to both stations.

10. Apparatus for regulating the firing of anti-aircraft guns, comprising sighting means, range-finding means controlled by said sighting means, means associated with said range-finding means for tracing the graph of said range in time functions, means for extrapolating by aid of said graph a predicted range of the target and for determining the time of flight corresponding to said range, a tachometer controlled by a sighting device maintained on the target, and means for determining the angular correction of sight for the duration of flight, comprising an angularly movable index hand controlled by said tachometer, the tangent of the angle of displacement of said hand being proportional to the angular speed of said target, a scale in the path of said hand, and means for moving said scale in accordance with the duration of said flight, the readings on said scale indicating directly the product of the angular speed of said target by the duration of flight.

11. In apparatus of the character described, the combination of a transmitting station and an auxiliary station each of which is provided with a sighting device, a receiving station provided with two pivoted alidade members having operative connections with said sighting devices to synchronize their movements with the directions of aim in a common plane of sighting of said sighting devices, a recording surface provided with means for uniformly advancing the same, a tracing device movable over said surface and provided with a tangent indicator, a flexible connection provided with an index, one end of said connection being fast to said device and the opposite end fast to one of said alidade arms, tension means carried by said arm for keeping said connection taut, manual means for advancing said tracing member over said surface while maintaining said index at the intersection of said alidade arms to trace a graph of the range in time functions, and a support having a curve adapted to be interrupted by said tangent indicator giving extrapolated distances for determined times of flight.

12. In apparatus of the character described, two sighting stations each provided with a sighting device, comprising a jointed parallelogram frame provided with two telescopes maintained parallel to each other; and means for distorting said frame both clockwise and anti-clockwise; and revoluble supports for said frames having connections for maintaining the frames in the same sighting plane.

In testimony whereof I have signed this specification in the presence of two subscribing witnesses.

JOSEPH LOUIS ROUTIN.

Witnesses:
 HENRI NONIN,
 CHAS. P. PRESSLY.